Figure 1:
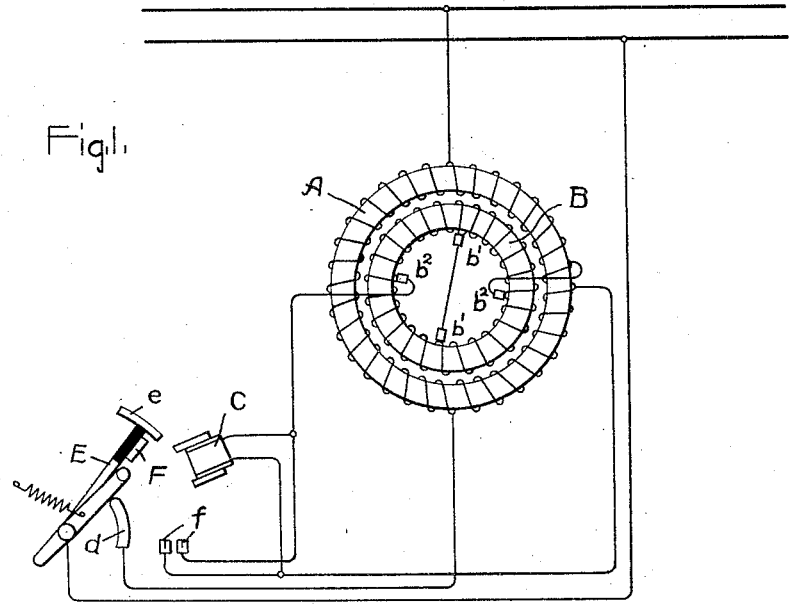

No. 819,572. PATENTED MAY 1, 1906.
M. MILCH.
ALTERNATING CURRENT MOTOR AND STARTING SWITCH.
APPLICATION FILED SEPT. 9, 1904.

WITNESSES:

INVENTOR:
Maurice Milch,
by Albert G. Davis
Atty.

UNITED STATES PATENT OFFICE.

MAURICE MILCH, OF SCHENECTADY, NEW YORK, ASSIGNOR TO GENERAL ELECTRIC COMPANY, A CORPORATION OF NEW YORK.

ALTERNATING-CURRENT MOTOR AND STARTING-SWITCH.

No. 819,572.      Specification of Letters Patent.      Patented May 1, 1906.

Application filed September 9, 1904. Serial No. 223,838.

*To all whom it may concern:*

Be it known that I, MAURICE MILCH, a subject of the King of Hungary, residing at Schenectady, in the county of Schenectady and State of New York, have invented certain new and useful Improvements in Alternating-Current Motors and Starting-Switches, of which the following is a specification.

My invention relates to alternating-current motors of the commutator type; and its object is to provide a novel form of automatic control for such motors, whereby they are caused to start with the characteristics of a repulsion-motor and when up to speed caused to operate with the characteristics of an induction-motor.

In my former patent, No. 787,305, dated April 11, 1905, I have pointed out the fact that the repulsion-motor as heretofore constructed has the characteristics of the direct-current series motor—that is, it has a maximum torque at starting and the speed increases with a decrease of load—and that while such a motor is eminently suited for railway work it has a serious disadvantage as regards certain other classes of work in that its speed is not limited, so that with a light load the speed may reach dangerous value. I have also pointed out that a single-phase induction-motor while having no starting torque has a large torque near synchronism and will not race under any conditions of load, and I have disclosed in that application a motor provided with a polyphase arrangement of short-circuiting brushes, so placed on the commutator that the motor combines the characteristics of the repulsion-motor with that of the induction-motor—that is, it has a starting torque and its speed has a definite limit. Such a motor with all the brushes permanently short-circuited has a smaller starting torque than the ordinary repulsion-motor, and in a second application, Serial No. 189,121, filed by me January 15, 1904, I have disclosed an arrangement in which the motor is started as an ordinary repulsion-motor with only one set of brushes short-circuited and in which automatic means is provided for short-circuiting the second set of brushes when the motor is up to speed. By means of this arrangement the motor has the full starting torque of the ordinary repulsion-motor, but has its speed definitely limited when the second short-circuit is established. When a polyphase arrangement of brushes is used, the variation in the voltage at the brushes which are open-circuited at the starting may be utilized for controlling an automatic switch, which short circuits them when the motor is up to speed. In that application I showed a magnet-winding so connected as to have impressed upon it both the voltage induced at the open-circuited pair of brushes and a voltage approximately equal thereto at starting, the two voltages being opposed to each other. The magnet consequently is not energized at starting; but as the motor speeds up and the voltage across the open-circuited set of brushes decreases the magnet-winding becomes energized and closes a switch, short-circuiting the brushes either directly or through a source of compensating electromotive force.

My present invention consists in the combination with a motor of the type described in my former applications of an automatic switch, the magnet-winding of which instead of operating the switch when energized permits it to operate when deënergized. By this novel arrangement not only are the connections simplified, but since the magnet-winding is deënergized during the operation of the motor it may be made much smaller than would be possible with the former arrangement, and no current is wasted in the winding while the motor is running.

My invention will best be understood by reference to the accompanying drawings, in which—

Figure 2:
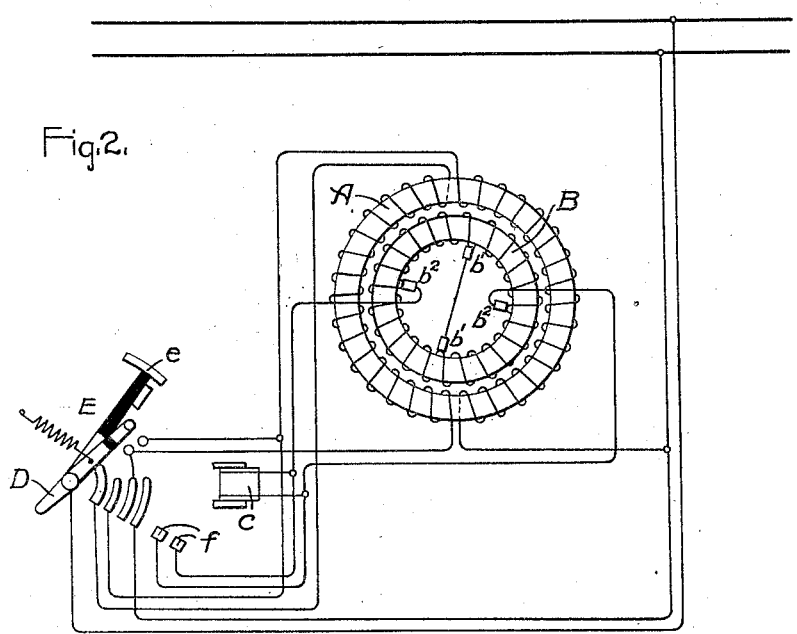

Figure 1 shows diagrammatically an alternating-current motor provided with an automatic controlling-switch in accordance with my invention, and Fig. 2 shows a modification of the same.

In Fig. 1, A represents the primary or stator winding, and B represents the secondary or rotor winding provided with two sets of brushes $b'\ b'$ and $b^2\ b^2$. The first set is permanently short-circuited and arranged at an angle to the line of magnetization produced by the primary winding, as in the ordinary repulsion-motor. A second set of brushes is connected through a small portion of the primary winding to the magnet-coil C of the automatic controlling-switch. I have indicated diagrammatically a construction of the switch itself, which is disclosed and fully described in Patent No. 775,501, issued to Ernest Schattner November 22, 1904. The switch consists of the pivoted arm D and a loosely-pivoted member E, which normally rests against and is operated by the arm D when it is moved to open the switch. As the arm D is moved into closed position to engage the stationary contact $d$ the arm E falls into the armature $e$, carried at its end, and is brought opposite to the poles of the magnet, on which is wound the coil C. If coil C is energized, the armature E will be restrained and will not follow the arm D to closed position. When coil C is deënergized, however, arm E will fall, bringing the contact member F, carried thereby, into engagement with the stationary contacts $f$.

The operation is then as follows: As soon as arm D comes into engagement with the contact $d$ the circuit of the motor is closed, and the motor starts like an ordinary repulsion-motor. The cross-flux in the motor produced by the rotor-winding induces an electromotive force between the brushes $b^2 b^2$, which at starting is of considerable magnitude, and this electromotive force energizes coil C, so that arm E is restrained in its open position. The small portion of the field-winding A which is included in circuit with the brushes $b^2 b^2$ may be neglected from consideration at starting on account of its relatively small amount as compared with the electromotive forces induced at the brushes $b^2 b^2$ at starting. As the motor speeds up, however, an electromotive force is induced between these brushes by cutting the primary field, and this second electromotive force opposes that due to transformer action. The resultant electromotive forces across the brushes $b^2 b^2$ consequently fall, decreasing the current-flow through magnet-winding C. By properly proportioning the strength of the magnet-winding it may be caused to release the arm E at any desired speed of the motor. Arm E will then fall, short-circuiting the contact $f$, which short-circuits the coil C and also short-circuits the brushes $b^2 b^2$ through the small portion of the primary winding included in circuit therewith. This small portion of the primary winding is included in circuit so as to impress upon the brushes a compensating electromotive force which improves the power factor of the motor. This source of electromotive force may be left out of circuit, if preferred, and the brushes short-circuited directly.

It is evident that, as disclosed in my former applications, the motor is changed from one torque characteristic to another when the circuit of the brushes $b^2 b^2$ is closed. If the circuit of these brushes be closed at the point where the two torque curves cross each other, it is evident that no shock will be produced in the motor. In other words, the winding C may be designed to release the arm E at a speed at which the torque of the motor is the same whether the circuit of the brushes $b^2 b^2$ is open or closed.

In Fig. 2 I have shown a modification in which the primary winding A is divided into two portions, which are connected first in series and then in parallel by the switch-arm D. This arrangement serves to decrease the current-flow in the motor at starting. The circuit of the brushes $b^2 b^2$ is so arranged that the brushes are short-circuited directly instead of through a source of compensating electromotive force, as in Fig. 1. These modifications are evident from the drawings and require no further description. Other arrangements of contacts and other methods for limiting the starting-current may of course be employed.

I do not desire to limit myself to the particular construction and arrangement of parts shown, but aim in the appended claims to cover all modifications which are within the scope of my invention.

What I claim as new, and desire to secure by Letters Patent of the United States, is—

1. In an alternating-current motor, a rotor-winding provided with a commutator, commutator-brushes and connections short-circuiting the rotor on a definite line, a starting-switch for the motor having a movable switch member adapted to close the circuit of the rotor-winding on a second line at an angle to the first, and means for retarding the movement of said switch member.

2. In an alternating-current motor, a rotor-winding provided with a commutator, commutator-brushes and connections short-circuiting the rotor on a definite line, a starting-switch for the motor having a movable switch member adapted to close the circuit of the rotor-winding on a second line at an angle to the first, and an electromagnet connected in shunt to the rotor-winding on said second line and adapted to retard the movement of said switch member.

3. In an alternating-current motor, a rotor-winding provided with a commutator, commutator-brushes and connections short-circuiting the rotor on a definite line, a starting-switch for the motor having a movable switch member adapted to close the circuit of the rotor-winding on a second line at an angle to the first, and means for arresting the movement of the switch member until the potential of said rotor-winding on said second line falls to a predetermined value.

4. In an alternating-current motor, a rotor-winding provided with a commutator, commutator-brushes and connections short-circuiting the rotor-winding on a definite line, a switch adapted to close the primary circuit of the motor, a switch-arm arranged to fall by gravity when said switch is closed and to close the circuit of the rotor-winding on a second line at an angle to the first, and means for retarding the fall of said switch-arm.

5. In an alternating-current motor, a rotor-winding provided with a commutator, commutator-brushes and connections short-circuiting the rotor-winding on a definite line, a switch adapted to close the primary circuit of the motor, a switch-arm arranged to fall by gravity when said switch is closed and to close the circuit of the rotor-winding on a second line at an angle to the first, and means for arresting the fall of said switch-arm until the potential of the rotor-winding on said second line falls to a predetermined value.

6. In an alternating-current motor, a rotor-winding provided with a commutator, a set of brushes arranged and connected to short-circuit the rotor-winding on a line at an angle to the primary field magnetization, a second set of brushes on a line displaced from the first, a starting-switch for the motor having a movable switch member adapted to close the circuit of said second set of brushes, and means for retarding the movement of said switch member.

7. In an alternating-current motor, a rotor-winding provided with a commutator, a set of brushes arranged and connected to short-circuit the rotor-winding on a line at an angle to the primary field magnetization, a second set of brushes on a line displaced from the first, a starting-switch for the motor having a movable switch member adapted to close the circuit of said second set of brushes, and a magnet-winding connected to said brushes and adapted to retard the movement of said switch-arm.

8. In an alternating-current motor, a rotor-winding provided with a commutator, a set of brushes arranged and connected to short-circuit the rotor-winding on a line at an angle to the primary field magnetization, a second set of brushes on a line displaced from the first, a starting-switch for the motor having a movable switch member adapted to close the circuit of said second set of brushes, and means for retarding the movement of said switch-arm until the potential between said brushes falls to a predetermined value.

9. In an alternating-current motor, a rotor-winding provided with a commutator, a set of brushes arranged and connected to short-circuit the rotor-winding on a line at an angle to the primary field magnetization, a second set of brushes on a line displaced from the first, a switch adapted to close the primary circuit of said motor, a switch-arm arranged to fall by gravity when said switch is closed and to short-circuit the second set of brushes, and a magnet-winding connected to said second set of brushes and adapted to restrain the movement of said switch-arm.

10. In combination, a repulsion-motor having two sets of commutator-brushes, said sets being displaced from each other by approximately ninety electrical degrees and both sets being displaced from the line of magnetization of the primary member, connections short-circuiting one set, a starting-switch having a movable switch member adapted and arranged to short-circuit the second set, and means for retarding the movement of said switch member.

11. In combination, a repulsion-motor having two sets of commutator-brushes, said sets being displaced from each other by approximately ninety electrical degrees and both sets being displaced from the line of magnetization of the primary member, connections short-circuiting one set, a starting-switch having a movable switch member adapted and arranged to short-circuit the second set, and a magnet-winding connected to said second set of brushes and adapted to retard the movement of said switch member.

12. In combination, a repulsion-motor having two sets of commutator-brushes, said sets being displaced from each other by approximately ninety electrical degrees and both sets being displaced from the line of magnetization of the primary member, connections short-circuiting one set, a source of compensating voltage, a starting-switch having a movable switch member adapted and arranged to short-circuit the second set through said source, and means for retarding the movement of said switch member.

13. In an alternating-current motor, a rotor-winding provided with a commutator, a set of brushes arranged and connected to short-circuit the rotor-winding on a line at an angle to the primary field magnetization, a second set of brushes on a line displaced from the first, a source of compensating voltage, a starting-switch having a movable member adapted to close the circuit of said second set of brushes through said source, and means for retarding the movement of said member.

14. In an alternating-current motor, a rotor-winding provided with a commutator, commutator-brushes and connections short-circuiting the rotor on a definite line, a source of compensating voltage, a starting-switch having a movable member adapted to close the circuit of the rotor-winding through said source on a second line at an angle to the first, and means for retarding the movement of said member.

15. In an alternating-current motor, a stator-winding, a rotor-winding provided with a commutator, commutator-brushes and connections short-circuiting the rotor-winding on a definite line, a starting-switch for the motor adapted to connect the stator-winding in series and in parallel, a switch member adapted to move to closed position when said switch is closed and to close the circuit of the rotor-winding on a second line at an angle to the first, and means for retarding the movement of said switch member.

16. In combination, a repulsion-motor having two sets of commutator-brushes displaced from each other by approximately ninety electrical degrees and both sets being displaced from the line of magnetization of the primary member, connections short-circuiting one set, a starting-switch for the motor adapted to connect the primary winding of the motor in series and in parallel, a switch member adapted to move to closed position when said switch is closed and to close the circuit of the second set of brushes, and means for retarding the movement of said switch member.

17. In an alternating-current motor, a rotor-winding provided with a commutator, commutator-brushes and connections short-circuiting the rotor on a definite line, a starting-switch for the motor having a movable switch member adapted to short-circuit the rotor-winding independently of said brushes, and means for retarding the movement of said switch member.

18. In an alternating-current motor, a rotor-winding provided with a commutator, commutator-brushes and connections short-circuiting the rotor on a definite line, a starting-switch for the motor having a movable switch member adapted to short-circuit the rotor winding independently of said brushes, and a magnet-winding in the circuit of the motor arranged to retard the movement of said switch member.

19. In an alternating-current motor, a rotor-winding provided with a commutator, commutator-brushes and connections short-circuiting the rotor-winding on a definite line, a switch adapted to close the primary circuit of the motor, a switch-arm arranged to fall by gravity when said switch is closed and to short-circuit the rotor-winding independently of said brushes, and means for retarding the fall of said switch-arm.

20. In an alternating-current motor, a rotor-winding provided with a commutator, commutator-brushes and connections short-circuiting the rotor-winding on a definite line, a switch adapted to close the primary circuit of the motor, a switch-arm arranged to fall by gravity when said switch is closed and to short-circuit the rotor-winding independently of said brushes, and a magnet-winding in circuit with the motor arranged to retard the fall of said switch-arm.

21. In an alternating-current motor, a rotor-winding provided with a commutator, commutator-brushes and connections short-circuiting the rotor-winding on a definite line, a switch-arm adapted to close the primary circuit of the motor, a second switch-arm operatively connected to the first and adapted to follow the first when the first arm is closed and to short-circuit the rotor-winding independently of said brushes, and means for retarding the movement of said second switch-arm.

22. In an alternating-current motor, a rotor-winding provided with a commutator, commutator-brushes and connections short-circuiting the rotor-winding on a definite line, a switch-arm adapted to close the primary circuit of the motor, a second switch-arm operatively connected to the first and adapted to follow the first when the first arm is closed and to short-circuit the rotor-winding independently of said brushes, and a magnet-winding in circuit with the motor arranged to retard the movement of said second switch-arm.

In witness whereof I have hereunto set my hand this 8th day of September, 1904.

MAURICE MILCH.

Witnesses:
HELEN ORFORD,
G. C. HOLLISTER.